United States Patent Office 3,551,388
Patented Dec. 29, 1970

3,551,388
POLYAMIDE FIBERS OF IMPROVED DYEABILITY PREPARED IN THE PRESENCE OF ETHYLENE OR PROPYLENE CARBONATE
Arnulf C. T. Sippel and Maria-Lotte Bumiller, Freiburg im Breisgau, and Paul Vollmer, Gundelfingen, near Freiburg im Breisgau, Germany, assignors to Deutsche Rhodiaceta A.G., Freiburg im Breisgau, Germany
No Drawing. Filed Mar. 21, 1968, Ser. No. 714,799
Claims priority, application Germany, Mar. 21, 1967, D 52,589
Int. Cl. C08g 17/13; 20/00, 20/38
U.S. Cl. 260—77.5        15 Claims

ABSTRACT OF THE DISCLOSURE

The dyeability of polyamide fibers with acid dyes is improved by addition during the polymerizable of 1–5% of an alkylene carbonate. Even better results are obtained if another amide, in the amount up to 20%, is added, so that copolyamides are obtained. The chain length is preferably regulated with chain breakers.

---

This invention relates to polyamide fibers and more specifically to polyamide fibers of improved dyeability with acid dyes. The invention also covers the novel process for the preparation of the novel polyamide fibers described herein.

It is known in the art that polyamide fibers exhibit poor dyeing affinity to acid dyes and difficulties have been encountered in dyeing these fibers, particularly if it is desired to obtain deep colors. Many processes have been proposed for the purpose of improving the dyeability of polyamides. One process resides in controlling the degree of polymerization by breaking up the polymer chain through the addition of basic chain breakers. According to another process, superior dyeability is achieved by the use of copolyamides, for instance from nylon 66 together with nylon 6. Still another process resides in the addition of polycols to polyamides. This, however, requires lowering of the electrostatic charge.

The object of this invention is to provide novel polyamides of superior affinity to acid dyes, so that deep colors may be obtained. Another object is to provide a process for the preparation of the novel polyamides which is economical, suitable for large scale operation and which utilizes safe and readily-available materials.

It has now been found surprisingly, that the affinity of polyamides for acid dyes, may be greatly increased by the addition of a small amount of reactive substance. More specifically, the crux of this invention resides in the finding that superior dyeability is achieved if the monomer, prior to condensation, is mixed with an alkylene carbonate, in the proportion of 1 to 5% of the latter. The proportion of the alkylene carbonate is preferably between 1.5 and 3% of the weight of the monomer. Suitable alkylene carbonate is ethylene carbonate and propylene carbonate.

The procedure described in the preceding paragraph gives homoamides containing the alkylene carbonate. According to a preferred embodiment of the invention, the alkylene carbonate is added to a mixture of the main amide monomer and another amide, the latter in the proportion up to 20% of the weight of the first monomer. This procedure gives copolyamides containing the alkylene carbonate.

One advantage of the novel polyamides of this invention resides in the fact that the affinity for dyestuffs increases remarkably, and very unexpectedly, in a manner much greater than it would have been predicted in accordance with a linear function.

Tables 1 and 2 below illustrate the increase in color depth of the homopolyamides of this invention. The color depth of the products containing ethylene carbonate is about twice the color depth of conventional homopolyamides. With the copolyamides containing ethylene carbonate, for instance with a copolyamide from nylon 66 and 5–10% of caprolactam, the color depth increases even more. This is shown by the data in Table 4.

The determination of the terminal groups of the polyamides of this invention is conducted by determining the consumption of hydrochloric acid in a mixture of 70% of phenol and .30% of methanol by weight. This determination is conducted in a known fashion and the results are compared with conventional polyamides not containing the alkylene carbonate. The comparative data are tabulated in Tables 1 and 2. The consumption of hydrochloric acid is a measure of the ability of the material to absorb the dye and the greater is the amount of hydrochloric acid, the greater is the dye absorption. Although this invention is not to be limited by theoretical explanations of the mechanism of the reaction, which can only be speculative, it is believed that the alkylene carbonate produces a lengthening of the chain, probably through esterification of terminal carboxyly groups with the glycol from the alkylene carbonate.

In accordance with a preferred embodiment of the invention, the chain length of the polyamides is regulated by either allowing the polymerization to proceed for a short period of time or by addition of a chain breaker in a proportion higher than conventionally used. In this manner, a product is obtained which is suitable for spinning.

The following examples are described in detail for the purpose of further illustration of the invention.

EXAMPLE 1

A homogeneous solution of 3920 g. of hexamethylene diammoninum adipate in the equal weight of distilled water was added to a mixture of 80 g. of ethylene carbonate, and 20 g. of 70% acetic acid which acted as a chain breaker. This corresponded to about 2% by weight of ethylene carbonate. A 10 liter autoclave was charged with the above mixture, which was heated for 1.5 hours, at 215° C. under a pressure of 18 atmospheres. The water vapor was bled off and the temperature was allowed to rise up to 250° C. In the course of an additional 1.5 hours, the pressure was gradually allowed to drop to atmospheric pressure and the temperature let rise to 285° C., which temperature was maintained one-half hour longer. The polymeric product was removed from the autoclave, while purging with oxygen-free nitrogen, and was compressed on a water bath, under a pressure of 8 atmospheres. The strands which were obtained, were subjected to granulation. There was obtained a crystalline white polymer which could be spun by the melt-spinning process at 280° C., to give fibers. The polymer was subjected in an atmosphere of nitrogen at 280° C. to the melt-spinning process. The resulting fibers were of 150 denier titre and contained 10 filaments. The fibers were then stretched by conventional cold-drawing equipment and processes in the draw ratio of 1:3.9, giving fibers of final titre 39 denier.

EXAMPLE 2

An autoclave was charged with a solution of 3800 g. of hexamethyleneammonium adipate in an equal weight of water, 20 g. 70% acetic acid and 200 g. of ethylene carbonate. The polymerization was conducted in conventional manner. The product was spun in fibers, by application of a conventional melt-spinning process at 280° C. The extruded fibers were stretched with a draw ratio of 1:3.9, giving a product of titre 40 denier and 10 individual filaments. These fibers were dissolved in a mixture of methanol and phenol in the ratio of 30:70 by weight and titrated with hydrochloric acid. The degree of hydrochloric acid consumption corresponded to 90 moles of $NH_2$-groups present per $10^6$ g. nylon.

When nylon which had been prepared with ethylene carbonate, was subjected to the same test, that is, consumption of hydrochloric acid, the results indicated the presence of only 60 moles of $NH_2$-group per $10^6$ g. of nylon.

The test to determine the absorption of color of the fibers prepared as described above was conducted with a 1% solution of Telonfast Blue F in water, of pH 3.5, in a ratio of 50 parts of dyeing liquor per part of material, at the boiling temperature, for 1 hour. The amount of dye absorbed was 13%, by weight. In a comparative test, nylon 66 fibers, prepared without the addition of ethylene carbonate, absorbed only 7.7% by weight of the dye.

Table 1 below summarizes the comparative data of nylon 66 containing ethylene carbonate and nylon 66 without ethylene carbonate.

The data above indicate that the affinity of the nylon 66 fibers in accordance with this invention, that is, containing ethylene carbonate, is essentially twice the affinity of the same fibers without ethylene carbonate.

EXAMPLE 3

A 10-liter autoclave was charged with a solution of 3430 g. of caprolactam in an equal weight of water, 70 g. of ethylene carbonate in 350 g. distilled water, and the material was heated at 12 atmospheres, for 1 hour, during which time the water vapor was allowed to bleed off and the temperature rose from 215° C. to 250° C. During the course of an additional 2 hours, the pressure was allowed to drop gradually to atmospheric pressure and the temperature reached 260° C. This temperature was maintained for an additional 1.5 hours and then the polymer was extruded by passing through a nozzle of 3 mm. diameter, under a pressure of 8 atmospheres in an atmosphere of oxygen-free nitrogen. The product was quenched and granulated. The relative viscosity of the product in a 8.4% by weight solution in 90% by weight formic acid, was 23.

After removal of the residual monomer by extraction, the granulated material was spun at a temperature of 285° C. through a spinnerette, in an atmosphere of nitrogen, giving fibers, which were collected at the rate of 370 meters per minute. Cold-drawing in the draw ratio of 1.3, gave fibers of 50 denier. The fibers were dyed similarly to the product in Example 2 above. The data of absorption of the dye are summarized in Table 2 below.

TABLE 2

Comparative dyeability of (a) nylon 6 containing ethylene carbonate and (b) without ethylene carbonate Material used:
(a) Nylon 6 with 2% ethylene carbonate _____ [1] 15
(b) Nylon 6 without ethylene carbonate _____ [1] 11

[1] Grams of Telonfast Blue F absorbed, per 100 g. of conditioned fibers. Dye absorbed at the boiling temperature.

The data above demonstrate that the absorption of dye is about 40% higher with the fibers spun from nylon 6 containing ethylene carbonate than with fibers spun from nylon 6, without ethylene carbonate, of essentially same viscosity.

In analogy with the spun fibers, also the granulated material from nylon 66 and ethylene carbonate prepared according to this invention exhibited an increase in the absorption of the dye. These data are summarized in Table 3 below. For this test, the granualted polyamide was dyed with 1% solution of Telonfast Blue F at pH 3.5, in the proportion of 50 parts of dyeing liquor per part of material, for 8 hours, at the boiling temperature. The degree of absorption of the dye was determined calorimetrically. The data with a control of granulated material from nylon 66 without ethylene carbonate are also shown.

TABLE 1.—COMPARATIVE DYEABILITY OF (A) NYLON 66 CONTAINING ETHYLENE CARBONATE AND (B) WITHOUT ETHYLENE CARBONATE

| Material tested | Consumption of hydrochloric acid in moles per $10^6$ g. nylon | Dye absorbed [1] at— | |
|---|---|---|---|
| | | 30° C. | Boiling temperature |
| (a) Nylon 66 with 2% ethylene carbonate | 95 | 0.7 | 11 |
| (b) Nylon 66 without ethylene carbonate | 47 | 0.4 | 6 |

[1] Grams of Telonfast Blue F absorbed, per 100 g. of conditioned fibers.

TABLE 3.—DYEABILITY OF (A) GRANULATED NYLON 66 WITHOUT ETHYLENE CARBONATE (B) GRANULATED NYLON 66 WITH 2.5% ETHYLENE CARBONATE AND (C) NYLON 66 WITH 5% OF ETHYLENE CARBONATE

| Material used | Hydrochloric acid consumed in moles, per $10^6$ g. nylon | Dye absorbed at the boiling point [1] |
|---|---|---|
| (a) Granulated nylon 66 without ethylene carbonate | 49 | 5 |
| (b) Granulated nylon 66 with 2.5% ethylene carbonate | 139 | 9 |
| (c) Nylon 66 with 5% of ethylene carbonate | 180 | 9 |

[1] Grams of Telonfast Blue F absorbed per 100 g. of granulated nylon

The data in Table 4 below demonstrate the improvement achieved with copolyamides containing ethylene carbonate, in accordance with this invention. A copolyamide from nylon 66 was prepared with 5% and 10% of caprolactam respectively, with and without 2% ethylene carbonate. Experiment 1 was a control of the homopolyamide of nylon 66, without ethylene carbonate.

TABLE 4.—GRAMS OF DYE TELONFAST BLUE F ABSORBED, PER 100 g. OF FIBROUS MATERIAL OF NYLON 66

| | Material added during the polymerization | | |
|---|---|---|---|
| Exp. No. | Percent of ethylene carbonate | Percent of caprolactam | Dye absorbed in grams |
| 1 | | | 1.9 |
| 2 | 2 | | 3.4 |
| 3 | | 5 | 3.0 |
| 4 | 2 | 5 | 5.2 |
| 5 | | 10 | 4.1 |
| 6 | 2 | 10 | 7.0 |

The data in Table 4, and specifically comparison between Experiments No. 2 and No. 4 indicate the superiority of the copolyamide over the homopolyamide. The copolyamide in Experiment No. 6, with 10% of caprolacam, was even superior in dyeability. Equally satisfactory results are obtained with a copolyamide from caprolactam and up to 20% of hexamethylene diammonium adipate.

It is manifest that by this invention, novel synthetic polyamides and copolyamides are provided which exhibit increased absorption for acid dyes. The invention also provides a method for increasing the color depth of synthetic homopolyamides and copolyamides, which is simple and suitable for a large scale operation. The alkylene carbonates in accordance with this invention are reactive at the temperautre of the polymerization, easy to handle and not toxic, properties which make them preferable to alkylene oxides and other glycols.

Although the invention has been described in detail with only one acid dye, Telonfast Blue F, and nylon 66, nylon 6 and caprolactam, those skilled in the art will readily appreciate that the invention is equally applicable to other synthetic polyamides and other acid dyes.

What is claimed is:

1. A process for the preparation of a polyamide of improved affinity for acid dyes, which comprises conducting the polymerization in the absence of a catalyst of at least one amide monomer which is a member selected from the group consisting of hexamethylene diammonium adipate and caprolactam in the presence of 1–5% by weight of ethylene carbonate or propylene carbonate.

2. The process according to claim 1 wherein the alkylene carbonate is ethylene carbonate.

3. The process according to claim 2 wherein ethylene carbonate is in amount between 1.5 and 3% by weight.

4. The process according to claim 1 wherein two amide monomers are polymerized, the second monomer is in amount up to 20% by weight of the total mixture, and the product is a copolyamide.

5. The process according to claim 4 wherein hexamethylenediammonium adipate is polymerized with caprolactam the latter in amount up to 20% by weight of the mixture, in the presence of 2% by weight of ethylene carbonate.

6. The process according to claim 1, wherein a chain breaker is added during the polymerization.

7. The process according to claim 6 wherein the chain breaker is 70% acetic acid.

8. The process according to claim 4 wherein caprolactam is the amide polymer which is polymerized with hexamethylenediammonium adipate, the latter in amount up to 20% by weight of the mixture.

9. A polyamide of improved affinity for acid dyes which is a member of the group consisting of homopolyamides and copolyamides from the condensation-polymerization in the absence of a catalyst of hexamethylene diammonium adipate, caprolactam and mixtures thereof wherein ethylene carbonate or propylene carbonate in the amount of 1–5% by weight has been added during the condensation-polymerization.

10. The copolyamide according to claim 9 wherein hexamethylene diammonium adipate is polymerized with 5–20% by weight caprolactam in the presence of ethylene carbonate.

11. The copolyamide according to claim 10 wherein caprolactam is polymerized with 5–20% by weight of hexamethylene diammonium adipate in the presence of ethylene carbonate.

12. Molded articles and bristles made of a polyamide prepared according to the process of claim 1.

13. Molded articles and bristles made of copolyamide prepared according to the process of claim 4.

14. Polyamide fibers prepared according to the process of claim 1, followed by extrusion and stretching.

15. Copolyamide fibers prepared according to the process of claim 4, followed by extrusion and stretching.

References Cited

UNITED STATES PATENTS

| | | | |
|---|---|---|---|
| 2,174,527 | 10/1939 | Peterson | 260—78 |
| 3,239,490 | 3/1966 | Gee et al. | 260—78 |
| 3,304,289 | 2/1967 | Ballentine et al. | 260—78 |

SAMUEL H. BLECH, Primary Examiner

U.S. Cl. X.R.

8—178; 260—37.78